J. WILSON.

Cooking Stove.

No. 93. Reissued May 8, 1847.

N. PETERS, Photo-Lithographer, Washington, D. C.

UNITED STATES PATENT OFFICE.

JAMES WILSON, OF NEW YORK, N. Y.

IMPROVEMENT IN COOKING-STOVES.

Specification forming part of Letters Patent No. 4,528, dated May 16, 1846; Reissue No. 93, dated May 8, 1847.

*To all whom it may concern:*

Be it known that I, JAMES WILSON, of the city of New York, in the State of New York, have made a new and useful Improvement in Cooking-Stoves; and I do hereby declare that the following is a full and exact description thereof.

In its general construction my stove is similar to some other cooking-stoves now in use, as will be manifest from an inspection of the perspective view of it in the accompanying drawings, in which the situation of the fire-place, the oven behind it, and the openings for cooking-utensils occupying a flue-space above the oven are represented. The flue-space at the back is divided into three parts in a manner well known, the two outer flues being revertible or descending, and the middle flue an ascending one leading up to the exit-pipe. Between the back of the fire-place and the oven there is a heated-air space formed by using double plates, a device also well known. I have, however, so formed and arranged the plates of my stove as to conduct a portion of the air from the heated-air space above named to the back part of the oven, into which it is allowed to enter, and thus to communicate heat to that part where it is most needed. I have also so formed the partitions between the respective flues at the rear end of the stove as to cause them to increase the radiating-surface and to communicate from this cause an increased portion of heat to the oven.

Figure 1:
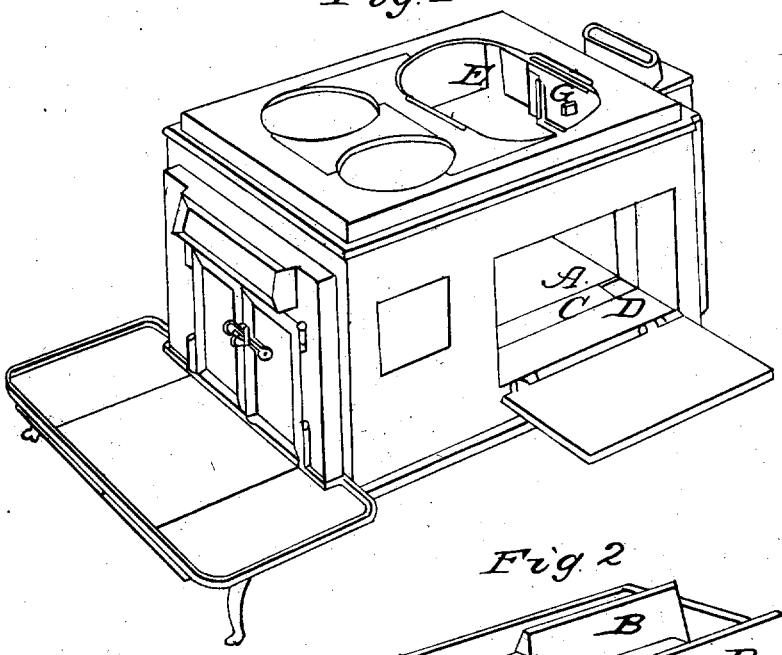
Figure 2:
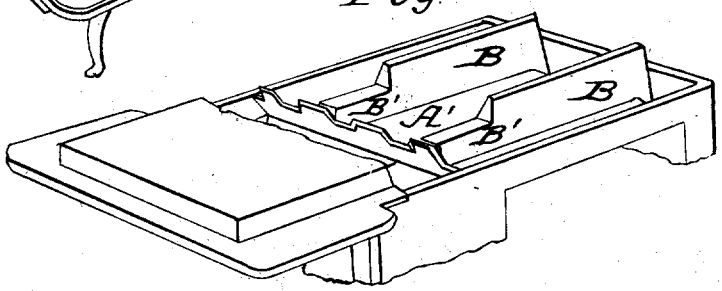
Figure 3:
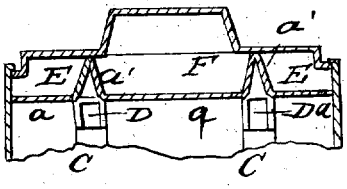

Figure 1 is a perspective view of my stove. Fig. 2 shows the under side of the bottom plate of the oven, that part of the bottom plate of the stove which is under the oven being removed for that purpose. Fig. 3 is a horizontal section through the back oven-plate and the back plate of the stove, showing the manner in which I form the partitions between the flue-spaces.

In each of these figures where the same parts occur they are designated by the same letters of reference.

In Fig. 1, A is the bottom plate of the oven, and A′, Fig. 2, the under side thereof. The space between the bottom plate of the oven and the bottom plate of the stove is partially divided into three flue-spaces by partitions B B, Fig. 2, extending from one of these plates to the other; but these partitions do not consist of a single flat plate, as in other stoves that are similarly divided, but are V-shaped at the part B, the lower angle extending down to the bottom plate of the stove, but at the fore end, as at B′. These partitions do not descend to the bottom plate, but terminate in the manner represented, in order to allow of a passage for the draft from the side flues to the middle flue, and thence to the exit-pipe. The V-shaped partitions B B, which are cast with the bottom plate of the oven, constitute flues the fore ends of which open into the air-heating space between the double plates at the back of the fire-chamber, which space is indicated by the dotted lines *b b*, Fig. 1. These V-formed partitions, like those in the back plate, greatly increase the heating-surface. The spaces between the sides of the partition-plates B B′ are each covered within the oven by plates C, Fig. 1, by which they are formed into heated-air flues. At their fore ends these air-flues communicate with the heated-air space between the back fire-plate and the fore oven-plate, as above described, and are intended to carry a portion of the air heated in that space to the back part of the oven into which it is to enter. To effect this the plates C do not extend entirely to the back end of the lower oven-plate, but terminate so as to leave openings at D in said plates through which the heated air enters into the rear part of the oven. The descending and ascending flues in the rear of the oven are also divided from each other by partitions that are V-formed, the back oven-plate being cast in the form shown at *a a a′ a′* in the section Fig. 3. By this means I greatly increase the heating-surface of the said plate, and consequently the temperature at the back of the oven. *c c*, Fig. 2, are openings for clearing out ashes from the flue-spaces under the oven. To these openings suitable stoppers are adapted.

E E are the descending flues, and F is the ascending flue in the rear of the stove. G is a damper, which when opened allows of a direct passage from the fire-chamber to the exit-pipe in a manner well known.

The course of the draft in my stove is the same with that of others previously made, and does not, therefore, form any part of my claim to novelty, but What I do claim as new, and desire to secure by Letters Patent, is—

1. The manner described of forming the partitions between the descending flues and the ascending flue in the rear of the oven, by means of which I increase the radiating-surface of the rear oven-plate and augment the temperature of that part.

2. The forming of the heated-air flues in the bottom plate by casting the partitions B B V-formed, and connecting them with the heated-air space between the fire-chamber and the oven, in the manner described.

JAMES WILSON.

Witnesses:
THOS. P. JONES,
WM. J. DONOHOO.